US012662124B2

(12) United States Patent
Gudapati

(10) Patent No.: US 12,662,124 B2
(45) Date of Patent: *Jun. 23, 2026

(54) VEHICLE MANAGEMENT FOR CAR WASH

(71) Applicant: FCA US LLC, Auburn Hills, MI (US)

(72) Inventor: Abhilash Gudapati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/653,042

(22) Filed: May 2, 2024

(65) Prior Publication Data

US 2025/0340207 A1 Nov. 6, 2025

(51) Int. Cl.
B60W 30/18 (2012.01)
B60K 35/10 (2024.01)
(Continued)

(52) U.S. Cl.
CPC ....... B60W 30/18009 (2013.01); B60K 35/10 (2024.01); B60K 35/22 (2024.01); B60W 10/04 (2013.01); B60W 10/10 (2013.01); B60W 10/182 (2013.01); B60W 50/14 (2013.01); *B60K 2360/115* (2024.01); *B60K 2360/161* (2024.01); *B60W 2050/146* (2013.01); *B60W 2510/10* (2013.01); *B60W 2520/10* (2013.01); *B60W 2540/227* (2020.02); *B60W 2552/15* (2020.02); *B60W 2555/20* (2020.02); *B60W 2710/06* (2013.01); *B60W 2710/186* (2013.01)

(58) Field of Classification Search
None
See application file for complete search history.

(56) References Cited

U.S. PATENT DOCUMENTS 8,583,330 B2 * 11/2013 Furness ..................... B60S 3/00
701/49
8,897,978 B2 * 11/2014 Fyie ...................... B60W 10/04
701/62

(Continued)

FOREIGN PATENT DOCUMENTS

CN 103161936 A * 6/2013 ............. F16H 59/08
CN 103161936 B * 12/2016 ............. F16H 59/08
(Continued)

OTHER PUBLICATIONS

Non-Final Office Action for U.S. Appl. No. 18/653,030 mailed Aug. 21, 2025.

*Primary Examiner* — Kevin R Steckbauer
(74) *Attorney, Agent, or Firm* — Jeremy J. Klobucar

(57) ABSTRACT

A vehicle system, for a vehicle that implements a car wash mode, includes a shifter configured to move the vehicle between Park, Reverse, Neutral, and Drive (PRND) positions, a propulsion system, an instrument panel cluster including a human machine interface (HMI), a brake system including a parking brake. A controller is programmed to determine the shifter is not in the Park position, display, via the HMI, an option to initiate a car wash mode if the following conditions are met: (i) a grade of the vehicle is below a predetermined threshold grade indicating a substantially flat surface, and (ii) a speed of the vehicle is below a predetermined car wash speed, and subsequently initiate the car wash mode if a user selects, via the HMI, the option to initiate the car wash mode.

19 Claims, 6 Drawing Sheets

(51) Int. Cl.

| | |
|---|---|
| *B60K 35/22* | (2024.01) |
| *B60W 10/04* | (2006.01) |
| *B60W 10/10* | (2012.01) |
| *B60W 10/18* | (2012.01) |
| *B60W 50/14* | (2020.01) |

(56) References Cited

U.S. PATENT DOCUMENTS

| | | | | |
|---|---|---|---|---|
| 12,468,308 | B2 * | 11/2025 | Cunningham | B60S 3/04 |
| 2013/0079998 | A1 * | 3/2013 | Furness | B60S 3/00 |
| | | | | 701/49 |
| 2013/0151095 | A1 * | 6/2013 | Fyie | B60W 10/04 |
| | | | | 701/62 |
| 2018/0038481 | A1 | 2/2018 | Wagner | |
| 2018/0339703 | A1 * | 11/2018 | Nix | G05D 1/0282 |

| | | | | |
|---|---|---|---|---|
| 2019/0054912 | A1 | 2/2019 | Harris et al. | |
| 2023/0311893 | A1 | 10/2023 | An | |
| 2024/0411312 | A1 * | 12/2024 | Cunningham | G05D 1/0276 |
| 2025/0121828 | A1 | 4/2025 | Jo | |
| 2025/0340206 | A1 * | 11/2025 | Gudapati | B60W 30/182 |
| 2025/0340207 | A1 * | 11/2025 | Gudapati | B60W 50/14 |

FOREIGN PATENT DOCUMENTS

| | | | | | |
|---|---|---|---|---|---|
| CN | 112550270 | A | * | 3/2021 | B60W 10/20 |
| CN | 112550270 | B | * | 11/2022 | B60W 40/109 |
| CN | 115339401 | A | * | 11/2022 | B60R 16/02 |
| CN | 119099616 | A | * | 12/2024 | G06V 10/12 |
| CN | 119840527 | A | * | 4/2025 | B60Q 9/00 |
| DE | 102019002591 | A1 | * | 11/2019 | B60W 30/182 |
| DE | 102021129630 | A1 | | 5/2023 | |
| DE | 102023128271 | A1 | * | 12/2024 | G06V 10/12 |
| EP | 4578754 | A1 | * | 7/2025 | B60W 30/182 |

* cited by examiner

VEHICLE MANAGEMENT FOR CAR WASH

FIELD

The present application relates generally to vehicle control systems and, more particularly, to vehicle control systems for managing vehicle mobilization and securement for a car wash.

BACKGROUND

During a car wash, vehicles may be damaged due to moving parts contacting the vehicle, or activation of rain sensor wipers. Additionally, proximity/autonomous sensor may cause the vehicle to brake or issue warnings constantly during the wash. In some cases, a vehicle may be unoccupied and may potentially roll during the wash. To prevent such issues, some vehicles include a car wash mode. However, such modes are often complex, not intuitive, and difficult to use. Thus, while such systems do work well for their intended purpose, it is desirable to provide continuous improvement in the relevant art to provide greater utility.

SUMMARY

In accordance with one example aspect of the invention, a vehicle system for a vehicle that implements a car wash mode is provided. In one exemplary implementation, the vehicle system includes a shifter configured to move the vehicle between Park, Reverse, Neutral, and Drive (PRND) positions, a propulsion system, an instrument panel cluster including a human machine interface (HMI), a brake system including a parking brake, and a controller having one or more processors.

The controller programmed to determine the shifter is not in the Park position; display, via the HMI, an option to initiate a car wash mode if the following conditions are met: (i) a grade of the vehicle is below a predetermined threshold grade indicating a substantially flat surface, and (ii) a speed of the vehicle is below a predetermined car wash speed, and initiate the car wash mode if a user selects, via the HMI, the option to initiate the car wash mode.

In addition to the foregoing, the described vehicle system may include one or more of the following features: wherein the controller is further programmed to, upon entering the car wash mode, display, via the HMI, a notification to shift the vehicle into Park or Neutral; wherein when the shifter is shifted to Park, the controller is further programmed to determine if a vehicle power down is requested, and: if yes, (i) disable the propulsion system and (ii) end the car wash mode when the vehicle is started; and if no, and if the driver has exited the vehicle, (i) maintain the vehicle in the car wash mode and in Park, (ii) disable the propulsion system, and (iii) turn OFF a vehicle ignition.

In addition to the foregoing, the described vehicle system may include one or more of the following features: wherein when the shifter is shifted to Neutral, the controller is further programmed to determine if a vehicle power down is requested, and: if yes, (i) maintain the vehicle in the car wash mode and in Neutral, (ii) disable the propulsion system, and (iii) turn OFF a vehicle ignition; and if no, (i) maintain the vehicle in the car wash mode and in Neutral, (ii) maintain the propulsion system ON, and (iii) maintain the vehicle ignition ON.

In addition to the foregoing, the described vehicle system may include one or more of the following features: wherein when the vehicle power down is not requested, the controller is further programmed to determine if the driver has exited the vehicle, and: if yes, (i) maintain the vehicle in the car wash mode and in Neutral, (ii) disable the propulsion system, (iii) prevent shifting to Park, and (iv) inform a rain sensor system that the vehicle is in the car wash mode and to monitor for a car wash active state; and if no, inform the rain sensor system that the vehicle is in the car wash mode and to monitor for the car wash active state.

In addition to the foregoing, the described vehicle system may include one or more of the following features: wherein the controller is further programmed to, during operation in the car wash mode, monitor: the grade of the vehicle, the speed of the vehicle, feedback from a rain sensor system, an internal car wash timer, PRND shift requests from the shifter, an operator request for reactivation of the propulsion system, and a driver presence detection system configured to detect if the driver is present in the vehicle; and wherein the controller is further programmed to, during operation in the car wash mode: apply the parking brake, turn OFF a vehicle ignition, and provide a notification via the HMI if: (i) the grade is greater than the predetermined threshold grade or the vehicle speed is greater than the car wash speed, (ii) the shifter is in Neutral, and (iii) the driver is not detected in the vehicle.

In addition to the foregoing, the described vehicle system may include one or more of the following features: wherein the controller is further programmed to determine if the rain sensor system detects an active car wash, and: if no, (i) maintain the vehicle in the car wash mode, and (ii) enable a car wash down timer indicating an issue with a car wash; and if yes, (i) provide a selection via the HMI to disable the car wash mode; wherein the controller is further programmed to, upon entering the car wash mode, disable the propulsion system, and disengage the parking brake; and wherein the controller is further programmed to, upon entering the car wash mode, disable a driver exit securement function, which is configured to activate the parking brake if it is determined the driver has exited the vehicle.

In accordance with another example aspect of the invention, a computer-implemented method for operating a vehicle in a car wash mode is provided. The method may be the same or similar to that described above.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
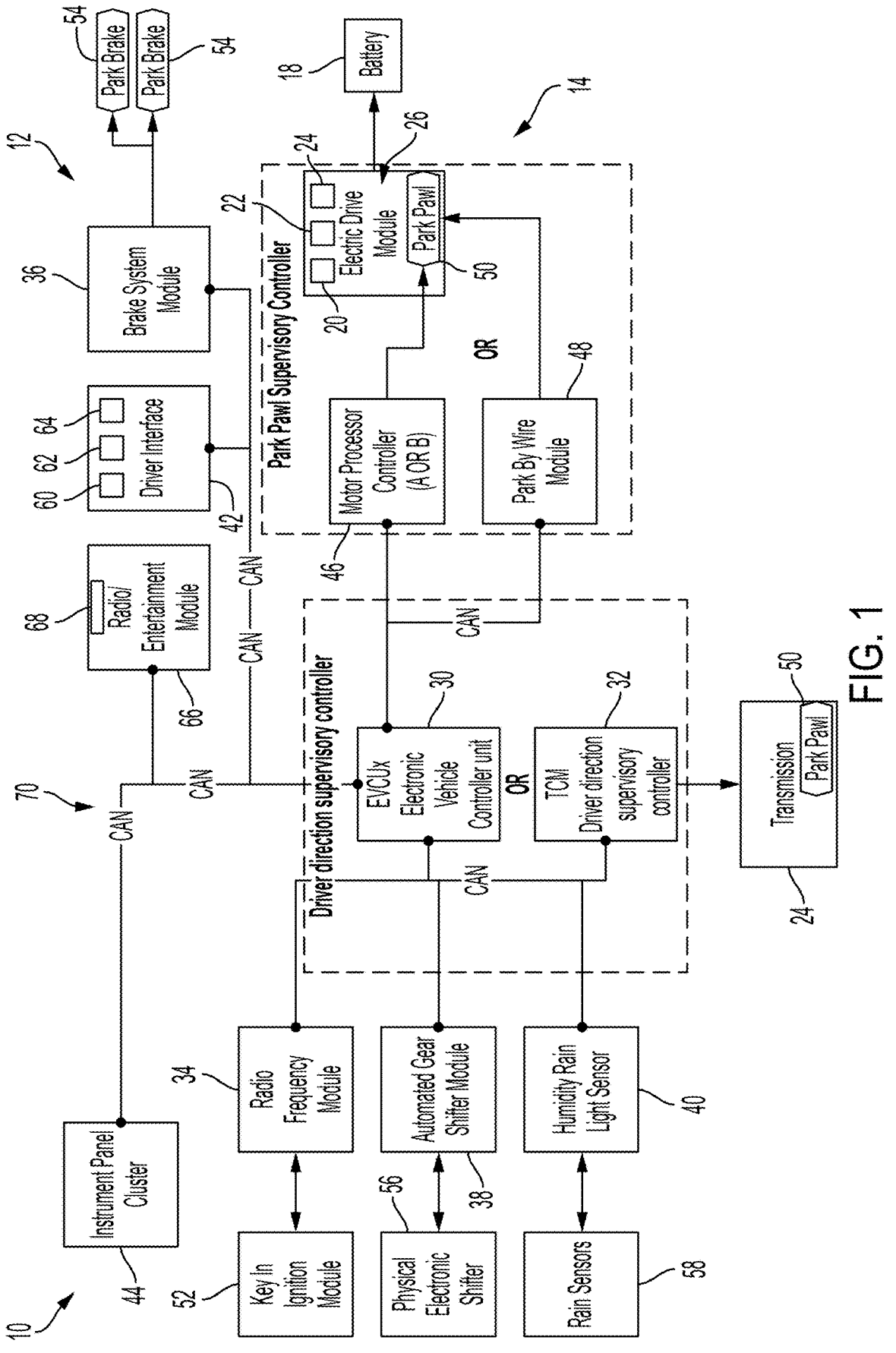
FIG. 1 is a schematic block diagram of an exemplary vehicle system according to the principles of the present disclosure.

As previously discussed, during a car wash, a vehicle may be damaged due to moving parts, rain sensor wipers may be activated, and proximity/autonomous collision sensors may cause the vehicle to brake or constantly issue warnings to the driver. Accordingly, described herein are systems and methods for intentional/automatic car wash mode selection and vehicle securement in the event of the driver leaving the vehicle during the Car Wash Mode.

Various types of car washes exist. One type is a touch-free stationary car wash, which typically includes washing bars spraying and performing washing when the vehicle is stationary in a specific location inside the car wash. Another type is a hand car wash where the customer typically performs hand washing by exiting the vehicle and utilizing a pressurized sprayer. Yet another type is an automated car wash where the vehicle is placed in neutral and moves on a conveyor belt. This may be a single side conveyor belt where the vehicle wheels roll as the vehicle advances through the wash, or a dual wheel conveyor belt where the wheels do not rotate and the vehicle is carried on a moving surface.

In the described embodiments, a Car Wash Mode may be selected through either the ignition button or through a human machine interface (HMI), for example, on a vehicle infotainment touch screen. In general, the ignition-based selection provides a unique and robust method for entering the car wash mode and ensures the mode is not misused. This method reduces the complexity in entering Car Wash Mode compared to conventional solutions, and ensures vehicle securement is correctly achieved when needed. The HMI-based selection provides Car Wash Mode entry selection only when the vehicle speed is less than the car wash speed threshold and the vehicle grade is less than a predetermined percentage (e.g., on or close to a flat surface). In one example, the car wash speed threshold is a calibratable threshold based on conventional car wash speeds (e.g., 3-4 kph, 2 kph, etc.).

The ignition-based selection accommodates for varying length car wash tunnels (e.g., 35-255 feet). Rather than relying on a distance calculator, a timer-based system is utilized as a function of vehicle speed to determine if the car wash has been paused or ended. If the wash has been paused, an additional timer is provided to ensure the vehicle can be taken into operator control. In a case where the wash is paused, an additional timer is given for restarting the car wash, and if no action is taken, the vehicle will be secured (e.g., placed in park).

The HMI-based selection includes considerations similar to the ignition-based selection, but provides a customer interface, which takes into consideration delays to enter the car wash tunnel, and use in a manual/hand car wash. If the driver leaves the vehicle with propulsion enabled, the system automatically disables the propulsion and ensures the vehicle is secured. The system also receives rain sensing wiper system feedback to ensure the vehicle is freewheeling through a car wash, and detects a downtime versus a car wash exit condition and additional timers to ensure the driver returns inside the vehicle (if exited) to re-enable propulsion. Once the system detects that propulsion is re-enabled, it provides an option to the driver to disable through a one-step process or via the radio/infotainment to disable the Car Wash Mode feature. Once the Car Wash Mode is disabled for an internal or driver selectable reason, the system provides the driver with notifications of the disablement. If the driver forgets or does not disable the selected mode, the system automatically disables the mode when the user is driving the vehicle. The system also considers a manual handwash, where the customer selects car wash in Park, and the mode is only disabled in the next key cycle.

Referring now to FIG. 1, a schematic diagram of a vehicle system 10 for a vehicle 12 according to example implementations of the disclosure is illustrated. In accordance with various aspects of the present disclosure, interactive techniques, referred to herein as a "Car Wash Mode," for preparing and securing the vehicle 12 for a car wash event are implemented utilizing the vehicle system 10. As will be discussed in greater detail below, in one example implementation, the Car Wash Mode is initiated upon a vehicle driver engaging an ignition button and/or selecting the Car Wash Mode from an interactive menu displayed on a display screen of the vehicle system 10.

With continuing reference to FIG. 1, the exemplary vehicle system 10 of the exemplary electrified vehicle 12 includes an electrified powertrain or propulsion system 14 configured to transfer drive torque to a driveline (not shown) of the vehicle 12 for propulsion. The electrified powertrain 14 generally comprises a high voltage battery system 18, one or more electric motors 20 with an associated inverter 22, and a gearbox or transmission 24. The one or more electric motors 20, the inverter 22, and the transmission 24 can be collectively referred to herein as an electric drive module 26. While the exemplary implementation includes a transmission 24, in some examples the electrified powertrain 14 does not include a transmission.

The vehicle system 10 further includes a supervisory controller 30, a transmission control module (TCM) 32, a radio frequency hub module (RFHM) 34, a brake system module (BSM) 36, an automated gear shifter management (AGSM) system 38, a humidity rain light sensor (HRLS) 40, a driver interface 42, and an instrument panel cluster 44.

The supervisory controller 30 includes one or more controllers (e.g., ECU, EVCU) configured to control operations of the vehicle 12. For example, controller 30 is configured to arbitrate park, reverse, neutral, and drive (PRND) after the driver selects a position through shifter inputs. The controller 30 is also in signal communication with a motor processor controller 46 for controlling the motor 20, as well as a park by wire module 48 configured to engage/disengage a park pawl 50. In the example implementation, the motor processor controller 46, the park by wire module 48, and the EDM 26 may be collectively referred to as a park pawl supervisory controller. The TCM 32 is a controller for controlling the transmission 24, including engaging and disengaging the park pawl 50. The controller 30 and TCM 32 may be collectively referred to as a driver direction supervisory controller.

The RFHM 34 is an ignition management controller in signal communication with a keyless ignition button 52 to stop/start the vehicle. The RFHM 34 is configured to manage the ignition states and key fob detection. The BSM 36 is configured to control one or more vehicle brakes, including one or more electronic parking brakes 54 when present. The AGSM system 38 is in signal communication with a transmission shift request device, such as an electronic shifter 56, for the driver to request a desired gear of the transmission 24. The shifter 56 can provide conventional transmission options including park, reverse, neutral, drive and low (PRNDL). The HRLS 40 is an automated rain sensing system configured to detect rain through rain sensors 58. In the example system, the rain sensing system 40 is configured to provide feedback indicating detection of an active car wash event.

The driver interface 42 includes a steering wheel 60, a brake pedal 62, and a driver input device (e.g., an accelerator pedal 64) for providing a driver input (e.g., a torque request) to the motor 20. The driver interface 42 can further include park brake 54 (not shown). The driver interface 42 also includes a transmission shift request device, such as the shifter 56, for the driver to request a desired gear of the transmission 24.

The instrument panel cluster 44 includes any human machine interface (HMI), such as a driver information center and/or vehicle infotainment system 66 (e.g., touchscreen display) capable of receiving input from a driver. The instrument panel cluster 44, also referred to as HMI 44, includes various indicators, such as a Car Wash Mode activate button/page/menu 68. In one example, the instrument panel cluster 44 and/or infotainment system 66 provides a menu driven sequence to the driver to enable the Car Wash Mode.

The transmission 24 and BSM 36 are coupled or selectively coupled, directly or indirectly, to one or more wheels (not shown) of vehicle 12, as is known in the art. In the exemplary vehicle system, all of the wheels are drive wheels that receive torque input. While the motor 20 is described herein as an electric traction motor, in other examples, the vehicle system 10 can be configured with a conventional internal combustion engine (ICE), or as a hybrid electric vehicle.

One or more controllers are utilized to control the various vehicle components or system discussed above. In one exemplary implementation, various individual controllers are utilized to control the various components/systems discussed herein and are in communication with each other and/or the various components/systems via a local interface 70. In this exemplary implementation, the local interface 70 is one or more buses or other wired or wireless connections, as is known in the art. In the example illustrated in FIG. 1, the local interface 70 is a controller area network (CAN). The CAN 70 may include additional elements or features, which have been omitted for simplicity, such as controllers, buffers (cache) drivers, repeaters and receivers, among many others, to enable communications. Further, the CAN 70 may include address, control and/or data connections to enable appropriate communications among the components/systems described herein.

It will be appreciated that while individual control units are discussed herein and shown in various Figures, the individual control units may also be optionally implemented in the form of one control unit, such as a powertrain or vehicle control unit. Thus, it will be appreciated that while the discussion will continue with reference to the individual controllers discussed above, the discussion is equally applicable to the components of vehicle system 10 being controlled by one controller.

As previously described, the vehicle system 10 is configured to provide an option to operate vehicle 12 in a Car Wash Mode. In the example embodiments, the driver may initiate the Car Wash Mode via the ignition button 52 or the HMI 44, as described in more detail below.

In one example operation, the Car Wash Mode is initiated through the ignition button 52 while the vehicle is freewheeling in Neutral. With the vehicle in Neutral and the vehicle ignition ON (Drive Ready for electrified vehicles, engine on for conventional vehicles), the system 10 monitors predetermined conditions to enable the Car Wash Mode. In one example, the predetermined conditions include the vehicle speed being lower than a car wash conveyor/tunnel speed (independent of the brake pedal 62 being pressed), and the vehicle grade being less than a predetermined threshold grade (e.g., such that the vehicle is on a flat or substantially flat surface).

The driver then presses the ignition button 52 a predetermined number of times (e.g., two). In response, the RFHM 34 signals the Car Wash Mode is Active and a Car Wash Mode HMI is displayed on the cluster 44. The system 10 then disables vehicle securement functions. More specifically, the system 10 (i) disables park pawl 50 engagement, which would otherwise occur if the driver intentionally exits the vehicle, and (ii) disables electronic parking brake 54 engagement, which also would otherwise occur if the driver exits the vehicle. At this point, the driver may exit the vehicle while the vehicle remains in Neutral. This operation may be desirable, for example, if the car wash does not allow drivers to remain in the vehicle during the wash. As such, this mode utilizes the existing ignition button system to create a specific method for the driver to ensure the vehicle 12 remains in the Car Wash Mode rather than automatically securing the vehicle upon exit or shutdown.

In another example operation, the Car Wash Mode is initiated through the selectable HMI interface 44 of the infotainment display 66. The car wash mode page 68 is only shown when the predetermined conditions to enter the Car Wash Mode are met, for example, the vehicle speed being lower than a car wash conveyor/tunnel speed, and the vehicle grade being less than a predetermined threshold. The system then operates in a manner similar to the previous operation to disable the securement functions to allow the driver to exit the vehicle 12.

Additionally, the system 10 and Car Wash Mode are configured to prevent unintentional vehicle securement due to a timer expiring during a long car wash. In one example, once the car wash mode is enabled via the ignition button 52 and the driver exit securement functions are disabled (e.g., stay in Neutral after driver exit and e-park brake disengaged), the system 10 monitors one or more conditions. Example conditions include vehicle grade, vehicle speed, internal car wash timers, operator request for propulsion reactivation, and driver presence detection.

If the driver has exited and conditions such as Grade>%, or vehicle speed>car wash speed, or car wash timers<car wash exit threshold (maximum car wash time based on the longest car wash), the system 10 will perform the following actions: (i) request electronic parking brake 54 application, (ii) engage the park brake 50 and/or park pawl 54, and (iii) turn the ignition OFF.

While the vehicle 12 is in Neutral in the car wash, if a scenario occurs where the car wash is paused due to an issue, the system 10 is configured to extend the car wash mode timer with a "car wash down timer" based on the vehicle speed dropping to zero and the current car wash timer being less than the expected timer. In one example, the expected timer is a calibratable timer for the expected length of a car wash (e.g., an average of 5-6 minutes).

During the car wash down time, if the vehicle speed changes with the vehicle still in Neutral and the car wash down timer has not elapsed, the Car Wash Mode is re-enabled with the remaining car wash mode timer (e.g., maximum car wash timer minus car wash mode timer elapsed from the time Car Wash Mode was enabled). If these conditions do not change, the system 10 is configured to perform the following actions: (i) request electronic parking brake 54 application, (ii) engage park pawl 50, and (iii) turn the ignition OFF.

However, if the internal car wash timer is greater than the maximum expected car wash timer and the remaining car wash conditions are still met, the system 10 is configured to extend the Car Wash Mode with a nominal amount of timer to protect for a longer wash tunnel scenario. If the extended car wash timer has also elapsed and the total time from the entry to car wash is greater than the expected timer, plus pause time, plus car wash down timer, and the remaining car wash conditions are met, the system 10 is configured to (i) request electronic parking brake 54 application, (ii) engage park pawl 50, and (iii) turn the ignition OFF. If the driver has re-entered the vehicle and restarts the propulsion system, the system 10 maintains the vehicle 12 in Neutral and the driver may then select a desired gear.

In another example operation, the Car Wash Mode is initiated through the selectable HMI 44 and the driver exit securement functions are disabled, as previously described. The system 10 then displays on the HMI 44 a notification that the Car Wash Mode is active and the driver may shift Park or Neutral when ready for a predetermined amount of time if the vehicle is currently in Drive/Reverse. This gives the driver the opportunity to enable the Car Wash Mode, wait in line to enter the car wash, or leave the vehicle in Park if the car wash is a hand or dual conveyor belt wash.

If the driver does not move the shifter 56 to Park or Neutral, the HMI 44 provides a reminder that Car Wash Mode is still enabled. If the driver moves the shifter 56 to Park and has powered down the vehicle 12 by pressing the ignition button 52, the system 10 initiates a normal shutdown by disabling the propulsion system. On the next power down cycle, the Car Wash Mode is ended upon starting the vehicle 12. This ensures that the other car wash functions are enabled until the next key cycle and do not end during the power down, thereby keeping the vehicle 12 in car wash to enhance the washing function.

If the driver has selected Park and exited the vehicle 12 with the propulsion system in an active state, the system 10 disables the propulsion system and the vehicle 12 remains in the Car Wash Mode even in ignition OFF. The Car Wash Mode ends when the driver enables propulsion by ignition ON.

If the driver has selected Neutral and powers down the vehicle 12, the system 10 maintains the vehicle in the Car Wash Mode and Neutral, disables the propulsion system, and the ignition immediately goes to OFF state. If the driver has selected Neutral and exited the vehicle with the propulsion system enabled, the vehicle 12 remains in the Car Wash Mode and Neutral, but the propulsion system is disabled.

The automated rain sensing system is informed the vehicle 12 is in Car Wash Mode, and the automated wiping can be turned off, but the system 10 receives information on detection of the car wash state (e.g., water droplets and force of wiping may be required). Through this process, the system 10 can distinguish if the vehicle 12 is still in the car wash, if the car wash has been paused, or the car wash has ended.

The system 10 then monitors a predetermined set of conditions such as, for example one or more of vehicle grade, vehicle speed, rain sensing system feedback, internal car wash timers, PRND requests, operator request for propulsion reactivation, and driver presence detection.

The system 10 is configured to perform the following actions when the driver has exited the vehicle 12, the vehicle is in Neutral, and the Grade>predetermined % or vehicle speed>car wash speed: (i) request electronic parking brake 54 application, (ii) engage park pawl 50, (iii) provide an HMI notification that the Car Wash Mode is disabled, and (iv) turn the ignition OFF.

If the vehicle is in Neutral in the car wash, and the scenario occurs where the car wash is paused due to an issue, the system 10 is configured to extend the car wash mode timer with a "car wash down timer" and operate as described in the previous example.

If the car wash has ended and the driver does not re-enter the vehicle to enable the propulsion system, the system 10 will remain in Car Wash Mode with the vehicle in Neutral and set a new timer "post car wash end time." If the timer expires and the driver still did not enter, the system 10 is configured to (i) request electronic parking brake 54 application, (ii) engage park pawl 50, (iii) provide an HMI notification that the Car Wash Mode is disabled, and (iv) turn the ignition OFF.

If the driver has re-entered and enabled the propulsion system, or if the driver was always present with the propulsion system enabled, the system 10 provides a notification on the HMI 44 to press a button (e.g., 68) for disabling the Car Wash Mode for a predetermined amount of time. If the driver selects the button, the system 10 disables Car Wash Mode and provides a notification thereof on the HMI 44. If the driver does not select the button, the system 10 is configured to arbitrate if the vehicle speed>car wash speed, and PRND state in Reverse/Drive AND/OR car wash timer>post exit time, then the HMI 44 indicates the Car Wash Mode is disabled. Alternatively, the driver may use the HMI 44 to disable the Car Wash Mode and a notification thereof is provided.

Figure 2A:
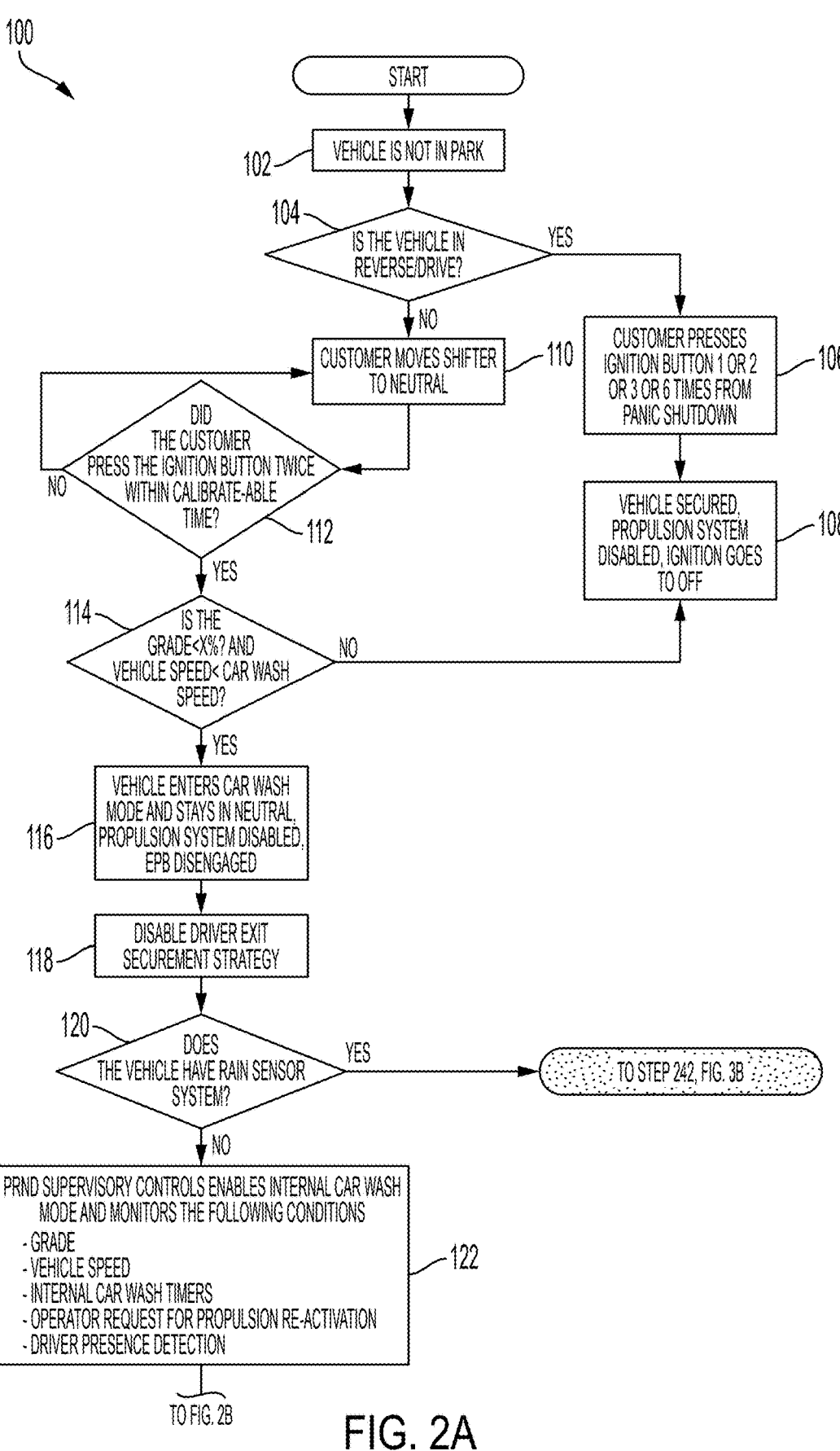
FIGS. 2A-2B illustrate an example flow diagram of a car wash mode implemented by the vehicle system of FIG. 1.
Figure 2B:
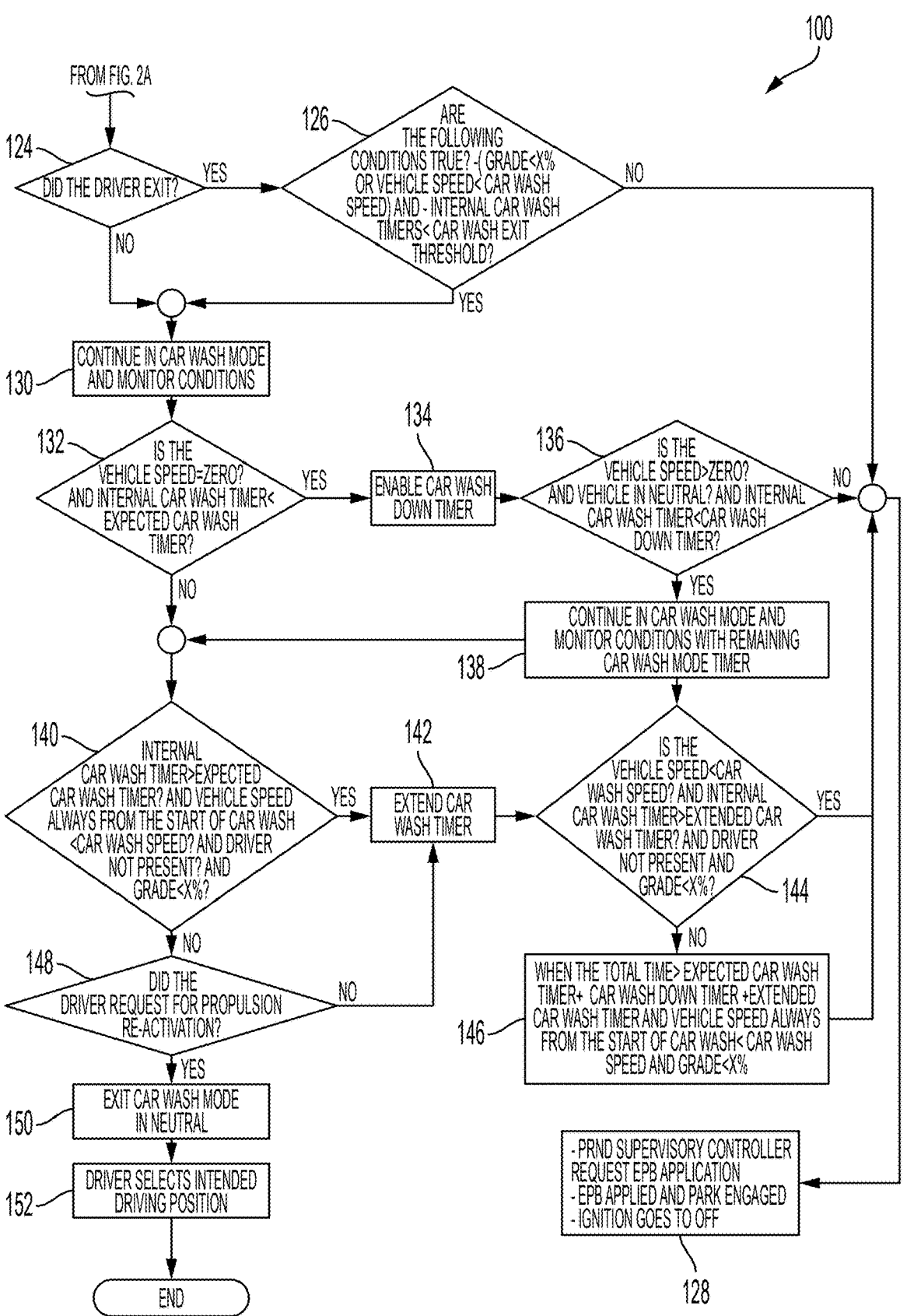
Figure 3A:
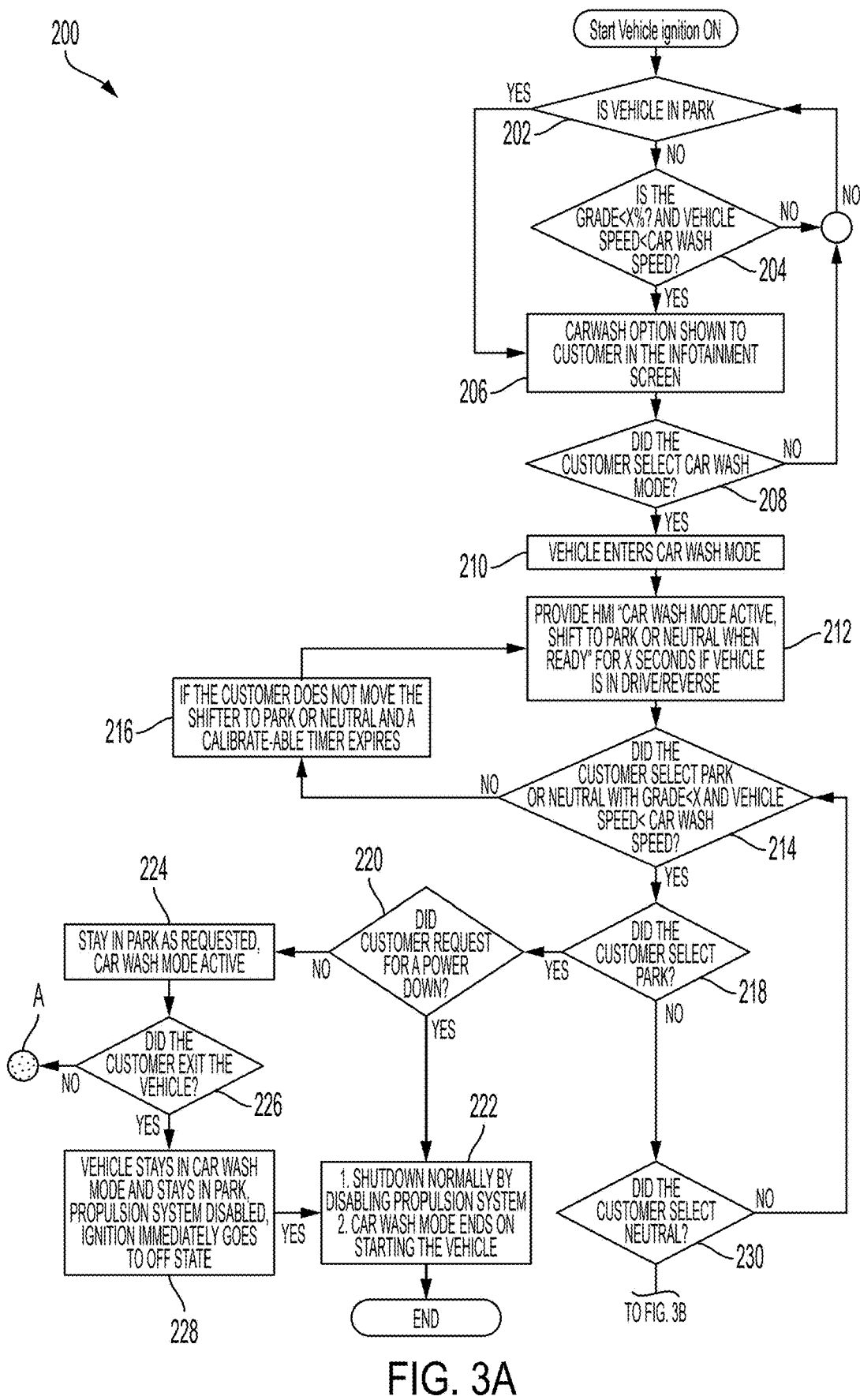
FIGS. 3A-3C illustrate an example flow diagram of another car wash mode implemented by the vehicle system of FIG. 1 according to the principles of the present disclosure.
Figure 3B:
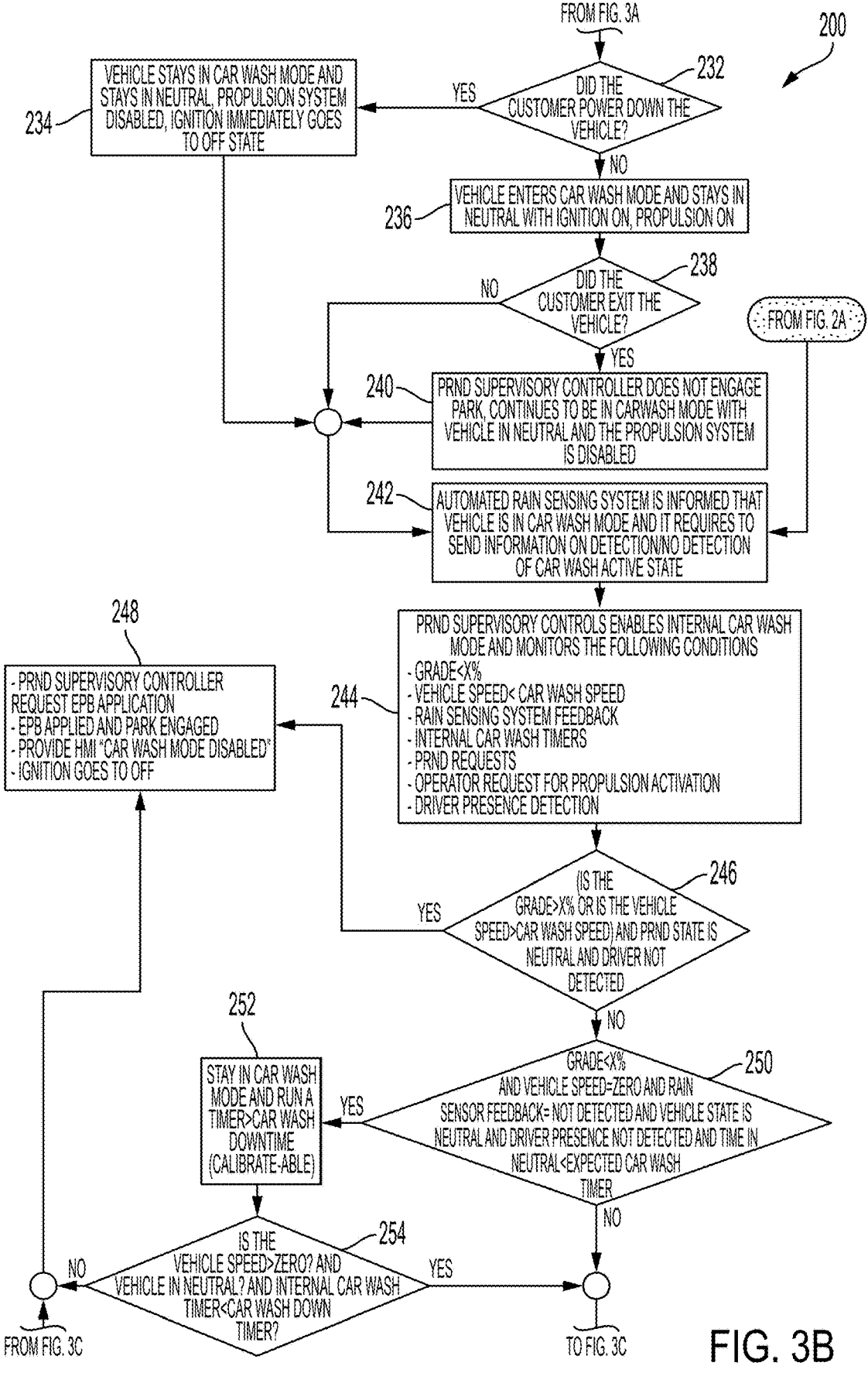
Figure 3C:
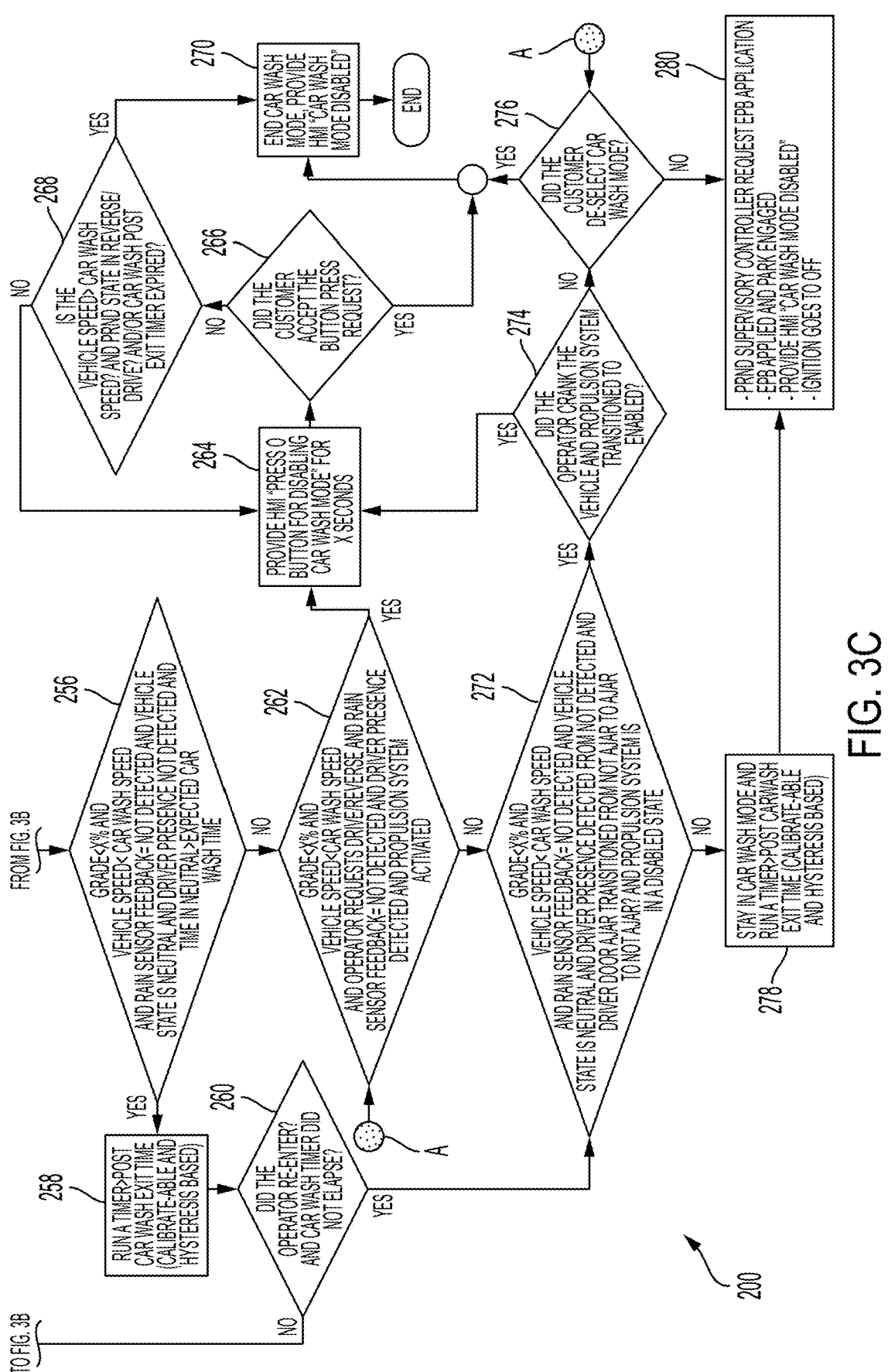

With reference now to FIGS. 1-3, systems and methods or techniques are provided for implementing the Car Wash Mode using the vehicle system 10. FIGS. 2A-2B illustrate an example method of implementing the Car Wash Mode through the ignition button 52. FIGS. 3A-3C illustrates an example method of implementing the car wash mode through the HMI 44.

With reference now to FIGS. 2A-2B, an example method 100 for operating the Car Wash Mode with the vehicle system 10 via the ignition button 52 will be described. The method 100 begins at step 102 and a system controller (e.g., ECU 30) determines the vehicle 12 not in Park. At step 104, control determines if the vehicle is in Reverse or Drive. If yes, at step 106, the driver presses the ignition button 52 any predetermined number of times, for example indicating a panic shutdown. At step 108, the vehicle 12 is secured, the propulsion system is disabled, and the ignition goes to OFF. However, if the vehicle is not in Reverse/Drive at step 104, control proceeds to step 110 indicating the driver has moved the shifter 56 to Neutral.

At step 112, control determines if the ignition button 52 has been pressed a predetermined number of times within a predetermined time period. If no, control returns to step 110. If yes, control proceeds to step 114 and determines if the vehicle grade is less than a predetermined threshold percentage and the vehicle speed is less than the car wash speed (e.g., calibratable for a typical car wash speed, 3-4 kph). If no, control proceeds to step 108. If yes, at step 116, control initiates the Car Wash Mode and maintains the Neutral gear state, disables the propulsion system, and disengages the electronic parking brake 54. At step 118, control disables the vehicle driver exit securement functions. At step 120, control determines if the vehicle includes a rain sensor system 40, 58. If yes, control proceeds to step 242 shown in FIG. 3B. If no, control proceeds to step 122.

At step 122, control enables the Car Wash Mode and monitors a predetermined set of conditions such as, for example, one or more of vehicle grade, vehicle speed, internal car wash timers, request for propulsion reactivation, and driver presence detection. At step 124, control determines if the driver has exited the vehicle. If yes, control proceeds to step 126. If no, control proceeds to step 130.

At step 126, control determines if the vehicle grade is less than a predetermined threshold percentage OR vehicle speed is less than car wash speed AND the internal car was timers are less than the expected car wash timer (e.g., calibratable average car wash time, 5-6 minutes). If no, control proceeds to step 128 and requests parking brake application, applies park pawl 50 and/or park brake 54, and turns the ignition OFF. Ignition OFF may be based on a specific timer. If yes, control proceeds to step 130.

At step 130, control maintains the Car Wash Mode and monitors vehicle conditions. At step 132, control determines if vehicle speed is zero AND the internal car wash timer is less than the expected car wash timer. If yes, control proceeds to step 134. If no, control proceeds to step 140.

At step 134, control enables the "car wash down timer" and proceeds to step 136 and determines if the vehicle speed is greater than zero AND if the vehicle is in Neutral AND the driver is not present in the vehicle AND the vehicle grade is less than the predetermined threshold. If not, control proceeds to step 128. If yes, control proceeds to step 138 and control maintains the vehicle in the Car Wash Mode and monitors vehicle conditions with the remaining car wash mode timer. Control then proceeds to step 140.

At step 140, control determines if the internal car wash timer is greater than the expected car wash timer AND if the vehicle speed is always less than the car wash speed AND the driver is not present in the vehicle AND the vehicle grade is less than the predetermined threshold percentage. If yes, control proceeds to step 142. If no, control proceeds to step 148.

At step 142, control extends the car wash timer and proceeds to step 144 and determines if the vehicle speed is less than the car wash speed AND the internal car wash timer is greater than the extended car wash timer AND the driver is not present AND the vehicle grade is less than the predetermined threshold percentage. If yes, control proceeds to step 128. If no, control proceeds to step 146 and, when the total time is greater than the sum of the expected car wash timer, the car wash down timer, and the extended car wash timer AND the vehicle speed from the start of the car wash is always less than the car wash speed AND the vehicle grade is less than the predetermined threshold percentage, control then proceeds to step 128.

If step 140 is false, control proceeds to step 148 and determines if the driver has requested propulsion reactivation (e.g., via shifter 56 or accelerator 64). If no, control proceeds to step 142. If yes, control proceeds to step 150 and exits the Car Wash Mode in the Neutral gear. At step 152, the driver selects the intended driving gear with shifter 56 and control ends.

With reference now to FIGS. 3A-3B, an example method 200 for operating the Car Wash Mode with the vehicle system 10 via the HMI 44 will be described. The method 200 begins at step 202 and a system controller (e.g., control 30) determines if the vehicle is in Park. If yes, control proceeds to step 206. If no, at step 204, control determines if the vehicle grade is less than a predetermined threshold percentage AND if the vehicle speed is less than the car wash speed. If no, control returns to step 202. If yes, at step 206, control displays a Car Wash Mode activate button/page/menu 68 via HMI 44, for example, on infotainment system 66. At step 208, control determines if the driver has selected the Car Wash Mode via 68. If no, control returns to step 202. If yes, control proceeds to step 210.

At step 210, control initiates the Car Wash Mode. At step 212, control provides a notification to the driver via the HMI 44 to shift to Park or Neutral when ready, if the vehicle is in Drive/Reverse. This notification may be displayed for a predetermined time period. At step 214, control determines if the driver subsequently selected Park or Neutral with the vehicle grade less than a predetermined threshold percentage AND the vehicle speed being less than the car wash speed. If no, control proceeds to step 216 and expires a calibratable timer if the driver does not move the shifter 56 to Park or Neutral, before returning to step 212. If yes, control proceeds to step 218.

At step 218, control determines if the vehicle is in Park. If yes, control proceeds to step 220. If no, control proceeds to step 230. At step 220, control determines if the driver requested a power down (e.g., via ignition button 52). If yes, control proceeds to step 222 and shuts the vehicle 12 down by disabling the propulsion system. The Car Wash Mode is ended upon the next vehicle start and control ends. If no, control proceeds to step 224 and maintains vehicle 12 in Park with the Car Wash Mode active. At step 226, control determines if the driver has exited the vehicle 12. If no, control proceeds to either "A" shown in FIG. 3C). If yes, control proceeds to step 228 and maintains the vehicle 12 in the Car Wash Mode and in Park, disables the propulsion system, and sets the ignition to OFF. Control then proceeds to step 222.

If the vehicle is not in Park at step 218, control proceeds to step 230 and determines if the driver shifted to Neutral. If no, control returns to step 214. If yes, control proceeds to step 232 and determines if the driver powered down the vehicle (e.g., via ignition button 52). If yes, at step 234 control maintains the vehicle in the Car Wash Mode and Neutral, disables the propulsion system, and turns the ignition to OFF, before proceeding to step 242. If no, at step 236, control initiates the Car Wash Mode, maintains the vehicle in Neutral with ignition ON and propulsion ON.

At step 238, control determines if the driver exited the vehicle. If no, control proceeds to step 242. If yes, at step 240, control does not engage Park (disables securement feature), maintains the vehicle in Neutral, and disables the propulsion system. Control then proceeds to step 242.

At step 242, control informs the automated rain sensing system 40 that the vehicle 12 is in the Car Wash Mode and to provide additional information on detection of an active car wash event. At step 244, control enables the internal car wash mode and monitors a predetermined set of conditions such as, for example, vehicle grade being less than a threshold percentage, vehicle speed being less than car wash speed, actively receiving rain sensing system feedback, internal car wash timers, PRND requests, operator requests for propulsion system activation, and driver presence detection.

At step 246, control determines if the vehicle grade is greater than the predetermined threshold percentage OR the vehicle speed is greater than the car wash speed AND the PRND state is Neutral AND the driver is not detected in the vehicle. If yes, control proceeds to step 248 and requests park brake application, applies the park brake 54, engages Park, provides an HMI notification that the Car Wash Mode is disabled, and turns the ignition to OFF. If no, control proceeds to step 250.

At step 250, control determines if the vehicle grade is less than the threshold percentage AND vehicle speed is zero AND rain sensor feedback indicates car wash not detected AND the vehicle is in Neutral AND driver presence is not detected AND the time in Neutral is less than the expected car wash timer. If no, control proceeds to step 256. If yes, control proceeds to step 252 and maintains the Car Wash Mode and initiates a timer greater than a car wash down time. Control then proceeds to step 254 and determines if the vehicle speed is greater than zero AND if the vehicle is in Neutral AND if the internal car wash timer is less than the car wash down timer. If no, control proceeds to step 248. If yes, control proceeds to step 256.

At step 256, control determines if the vehicle grade is less than the threshold percentage AND if the vehicle speed is less than the car wash speed AND if the rain sensor feedback is not detected AND if the vehicle is in Neutral AND driver presence is not detected in the vehicle AND if the time in neutral is greater than the expected car wash timer. If yes, control proceeds to step 258. If no, control proceeds to step 262.

At step 258, control initiates a timer greater than a post car wash exit time and proceeds to step 260 and determines if the driver re-entered the vehicle AND the car wash timer has not expired. If no, control proceeds to step 248. If yes, control proceeds to step 272.

At step 262, control determines if vehicle grade is less than the threshold percentage AND if vehicle speed is less than car wash speed AND if the driver requests a shift to Drive or Reverse AND if rain sensor feedback is not detected AND if driver presence is detected AND if the propulsion system is activated. If yes, control proceeds to step 264. If no, control proceeds to step 272.

At step 264, control provides an HMI notification to press a predetermined button (e.g., 68) for disabling the Car Wash Mode. The notification may be displayed for a predetermined amount of time. At step 266, control determines if the driver has pressed the button. If yes, control proceeds to step 270. If no, at step 268, control determines if the vehicle speed is greater than the car wash speed AND if the PRND state is in Reverse/Drive AND/OR the car wash post exit timer has expired. If no, control returns to step 264. If yes, at step 270, control ends the Car Wash Mode and provides an HMI notification that the mode is disabled.

At step 272, control determines if the vehicle grade is less than the threshold percentage AND if the vehicle speed is less than the car wash speed AND if the rain sensor feedback is not detected AND if the vehicle is in Neutral AND if driver presence is now detected AND if a driver door ajar has transitioned between ajar and not ajar states AND if the propulsion system is disabled. If yes, control proceeds to step 274. If no, control proceeds to step 278.

At step 274, control determines if the driver turned the vehicle ON and the propulsion system has become enabled. If yes, control proceeds to step 264. If no, control proceeds to step 276 and determines if the driver deactivated the Car Wash Mode. If yes, control proceeds to step 270. If no, control proceeds to step 280.

At step 278, control maintains the vehicle in the Car Wash Mode and runs a timer greater than the post car wash exit time. Control then proceeds to step 280 and requests park brake application, applies the park brake 54, engages park pawl 50, provides an HMI notification that the Car Wash Mode is disabled, and turns the ignition to OFF.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle system for a vehicle that implements a car wash mode, the vehicle system comprising:
   a shifter configured to move the vehicle between Park, Reverse, Neutral, and Drive (PRND) positions;
   a propulsion system;
   an instrument panel cluster including a human machine interface (HMI);
   a brake system including a parking brake; and
   a controller having one or more processors, the controller programmed to:
   determine the shifter is not in the Park position;
   display, via the HMI, an option to initiate a car wash mode if the following conditions are met: (i) a grade of the vehicle is below a predetermined threshold grade indicating a substantially flat surface, and (ii) a speed of the vehicle is below a predetermined car wash speed; and
   initiate the car wash mode if a user selects, via the HMI, the option to initiate the car wash mode,
   wherein the controller is further programmed to, during operation in the car wash mode, monitor:
   the grade of the vehicle;
   the speed of the vehicle;
   feedback from a rain sensor system;
   an internal car wash timer;
   PRND shift requests from the shifter;
   an operator request for reactivation of the propulsion system; and
   a driver presence detection system configured to detect if the driver is present in the vehicle.

2. The vehicle system of claim 1, wherein the controller is further programmed to, upon entering the car wash mode:
   display, via the HMI, a notification to shift the vehicle into Park or Neutral.

3. The vehicle system of claim 2, wherein when the shifter is shifted to Park, the controller is further programmed to determine if a vehicle power down is requested, and:
   if yes, (i) disable the propulsion system and (ii) end the car wash mode when the vehicle is started; and
   if no, and if the driver has exited the vehicle, (i) maintain the vehicle in the car wash mode and in Park, (ii) disable the propulsion system, and (iii) turn OFF a vehicle ignition.

4. The vehicle system of claim 1, wherein the controller is further programmed to, upon entering the car wash mode:
   disable the propulsion system; and
   disengage the parking brake.

5. The vehicle system of claim 1, wherein the controller is further programmed to, upon entering the car wash mode:
    disable a driver exit securement function, which is configured to activate the parking brake if it is determined the driver has exited the vehicle.

6. A vehicle system for a vehicle that implements a car wash mode, the vehicle system comprising:
    a shifter configured to move the vehicle between Park, Reverse, Neutral, and Drive (PRND) positions;
    a propulsion system;
    an instrument panel cluster including a human machine interface (HMI);
    a brake system including a parking brake; and
    a controller having one or more processors, the controller programmed to:
        determine the shifter is not in the Park position;
        display, via the HMI, an option to initiate a car wash mode if the following conditions are met: (i) a grade of the vehicle is below a predetermined threshold grade indicating a substantially flat surface, and (ii) a speed of the vehicle is below a predetermined car wash speed; and
        initiate the car wash mode if a user selects, via the HMI, the option to initiate the car wash mode,
    wherein when the shifter is shifted to Neutral, the controller is further programmed to determine if a vehicle power down is requested, and:
    if yes, (i) maintain the vehicle in the car wash mode and in Neutral, (ii) disable the propulsion system, and (iii) turn OFF a vehicle ignition; and
    if no, (i) maintain the vehicle in the car wash mode and in Neutral, (ii) maintain the propulsion system ON, and (iii) maintain the vehicle ignition ON.

7. The vehicle system of claim 6, wherein when the vehicle power down is not requested, the controller is further programmed to determine if the driver has exited the vehicle, and:
    if yes, (i) maintain the vehicle in the car wash mode and in Neutral, (ii) disable the propulsion system, (iii) prevent shifting to Park, and (iv) inform a rain sensor system that the vehicle is in the car wash mode and to monitor for a car wash active state; and
    if no, inform the rain sensor system that the vehicle is in the car wash mode and to monitor for the car wash active state.

8. The vehicle system of claim 6, wherein the controller is further programmed to, during operation in the car wash mode, monitor:
    the grade of the vehicle;
    the speed of the vehicle;
    feedback from a rain sensor system;
    an internal car wash timer;
    PRND shift requests from the shifter;
    an operator request for reactivation of the propulsion system; and
    a driver presence detection system configured to detect if the driver is present in the vehicle.

9. The vehicle system of claim 8, wherein the controller is further programmed to, during operation in the car wash mode:
    apply the parking brake, turn OFF a vehicle ignition, and provide a notification via the HMI if: (i) the grade is greater than the predetermined threshold grade or the vehicle speed is greater than the car wash speed, (ii) the shifter is in Neutral, and (iii) the driver is not detected in the vehicle.

10. The vehicle system of claim 8, wherein the controller is further programmed to determine if the rain sensor system detects an active car wash, and:
    if no, (i) maintain the vehicle in the car wash mode, and (ii) enable a car wash down timer indicating an issue with a car wash; and
    if yes, (i) provide a selection via the HMI to disable the car wash mode.

11. A computer-implemented method for operating a vehicle in a car wash mode, the vehicle including a shifter configured to move the vehicle between Park, Reverse, Neutral, and Drive (PRND) positions, a vehicle propulsion system, an instrument panel cluster including a human machine interface (HMI), a brake system including a parking brake, and a controller having one or more processors and a non-transitory computer-readable storage medium, the method comprising:
    determining, by the controller, the shifter is not in the Park position;
    displaying, via the HMI, an option to initiate a car wash mode if the following conditions are met: (i) a grade of the vehicle is below a predetermined threshold grade indicating a substantially flat surface, and (ii) a speed of the vehicle is below a predetermined car wash speed;
    initiating, by the controller, the car wash mode if a user selects, via the HMI, the option to initiate the car wash mode; and
    during operation in the car wash mode:
        monitoring, by the controller, the grade of the vehicle;
        monitoring, by the controller, the speed of the vehicle;
        monitoring, by the controller, feedback from a rain sensor system;
        monitoring, by the controller, an internal car wash timer;
        monitoring, by the controller, PRND shift requests from the shifter;
        monitoring, by the controller, an operator request for reactivation of the propulsion system; and
        monitoring, by the controller, a driver presence detection system configured to detect if the driver is present in the vehicle.

12. The method of claim 11, further comprising:
displaying, via the HMI, a notification to shift the vehicle into Park or Neutral.

13. The method of claim 12, further comprising:
when the shifter is shifted to Park, determining, by the controller, if a vehicle power down is requested, and:
if yes, by the controller, (i) disabling the propulsion system and (ii) ending the car wash mode when the vehicle is started; and
if no, and if the driver has exited the vehicle, by the controller, (i) maintaining the vehicle in the car wash mode and in Park, (ii) disabling the propulsion system, and (iii) turning OFF an ignition of the vehicle.

14. The method of claim 12, further comprising:
when the shifter is shifted to Neutral, determining, by the controller, if a vehicle power down is requested, and:
    if yes, by the controller, (i) maintaining the vehicle in the car wash mode and in Neutral, (ii) disabling the propulsion system, and (iii) turn OFF an ignition of the vehicle; and
    if no, by the controller, (i) maintaining the vehicle in the car wash mode and in Neutral, (ii) maintaining the propulsion system ON, and (iii) maintain the vehicle ignition ON.

15. The method of claim 14, further comprising:

when the vehicle power down is not requested, determining, by the controller, if the driver has exited the vehicle, and:

if yes, by the controller, (i) maintaining the vehicle in the car wash mode and in Neutral, (ii) disabling the propulsion system, (iii) preventing shifting to Park, and (iv) informing a rain sensor system that the vehicle is in the car wash mode and to monitor for a car wash active state; and if no, by the controller, informing the rain sensor system that the vehicle is in the car wash mode and to monitor for the car wash active state.

16. The method of claim 11, further comprising, during operation in the car wash mode:

by the controller, applying the parking brake, turning OFF a vehicle ignition, and providing a notification via the HMI if: (i) the grade is greater than the predetermined threshold grade or the vehicle speed is greater than the car wash speed, (ii) the shifter is in Neutral, and (iii) the driver is not detected in the vehicle.

17. The method of claim 11, further comprising: monitoring, by the rain sensor system, for an active car wash, and:

if the active car wash is not detected, by the controller, (i) maintaining the vehicle in the car wash mode, and (ii) enabling a car wash down timer indicating an issue with a car wash; and if the active car wash is not detected, by the controller, (i) providing a selection via the HMI to disable the car wash mode.

18. The method of claim 11, further comprising, upon entering the car wash mode:

disabling, by the controller, the propulsion system; and disengaging, by the controller, the parking brake.

19. The method of claim 11, further comprising, upon entering the car wash mode:

disabling, by the controller, a driver exit securement function, which is configured to activate the parking brake if it is determined the driver has exited the vehicle.

* * * * *